(12) United States Patent
Griggs, Jr.

(10) Patent No.: US 11,116,318 B2
(45) Date of Patent: Sep. 14, 2021

(54) READY TO ASSEMBLE RECLINER

(71) Applicant: Billy Joe Griggs, Jr., Pulaski, TN (US)

(72) Inventor: Billy Joe Griggs, Jr., Pulaski, TN (US)

( * ) Notice: Subject to any disclaimer, the term of this patent is extended or adjusted under 35 U.S.C. 154(b) by 0 days.

(21) Appl. No.: 15/812,255

(22) Filed: Nov. 14, 2017

(65) Prior Publication Data
US 2018/0352958 A1    Dec. 13, 2018

Related U.S. Application Data

(60) Division of application No. 14/167,986, filed on Jan. 29, 2014, now Pat. No. 9,814,314, which is a continuation-in-part of application No. 14/054,804, filed on Oct. 15, 2013, now Pat. No. 9,629,466.

(60) Provisional application No. 61/802,963, filed on Mar. 18, 2013, provisional application No. 61/758,242, filed on Jan. 29, 2013, provisional application No. 61/758,263, filed on Jan. 29, 2013, provisional application No. 61/713,289, filed on Oct. 12, 2012.

(51) Int. Cl.
*A47C 1/02* (2006.01)
*A47C 4/02* (2006.01)
*A47C 7/02* (2006.01)

(52) U.S. Cl.
CPC ............... *A47C 1/02* (2013.01); *A47C 4/02* (2013.01); *A47C 7/02* (2013.01); *F16B 2200/10* (2018.08)

(58) Field of Classification Search
CPC ............... A47C 1/02; A47C 4/02; A47C 7/02
USPC ............................................. 297/85 R, 440.1
See application file for complete search history.

(56) References Cited

U.S. PATENT DOCUMENTS

| 5,288,126 | A | * | 2/1994 | Saul | A47C 1/0355 |
| | | | | | 297/85 R |
| 5,704,686 | A | * | 1/1998 | May | A47C 1/0355 |
| | | | | | 297/85 R |
| 5,806,921 | A | * | 9/1998 | LaPointe | A47C 1/0345 |
| | | | | | 297/440.1 |
| 7,147,278 | B2 | * | 12/2006 | Johnson | A47C 1/0355 |
| | | | | | 297/85 R |
| 7,497,512 | B2 | * | 3/2009 | White | A47C 1/0355 |
| | | | | | 297/85 R |
| 2010/0072805 | A1 | * | 3/2010 | Qiu | A47C 1/0355 |
| | | | | | 297/85 R |

\* cited by examiner

*Primary Examiner* — Anthony D Barfield
(74) *Attorney, Agent, or Firm* — Wayne Edward Ramage; Baker Donelson

(57) ABSTRACT

A RTA recliner where the recliner mechanism is attached to various component parts through tool-less connections. In a disassembled configuration, the RTA recliner mechanism and component parts are constructed and arranged to fit within a substantially rectangular container with greater volume utilization. Components include, but are not limited to, a drive tube assembly and a handle assembly.

5 Claims, 25 Drawing Sheets

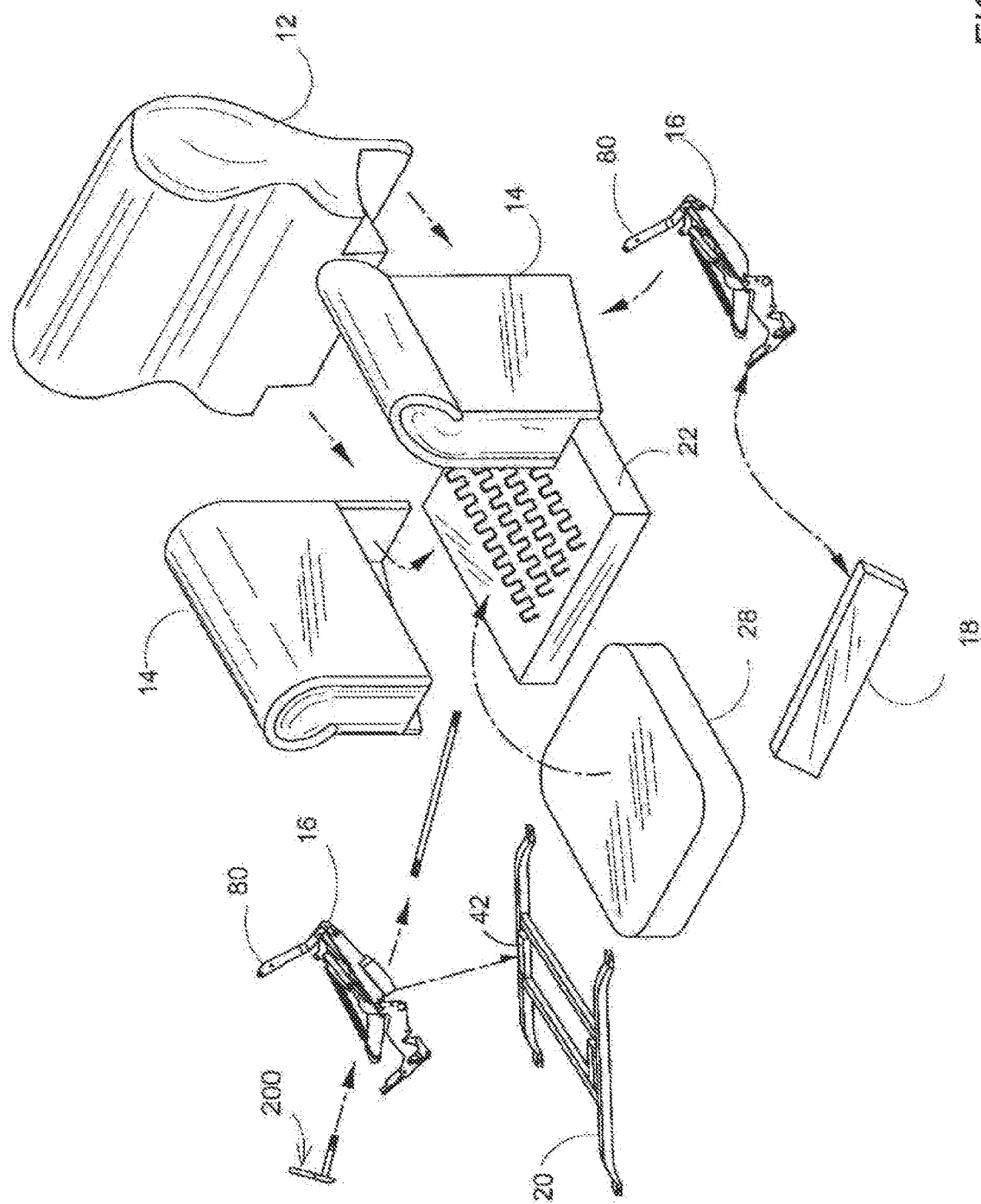

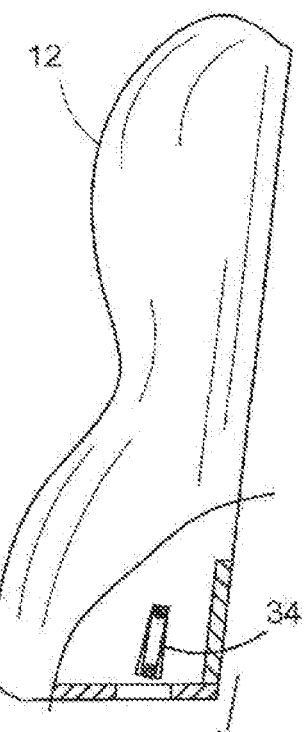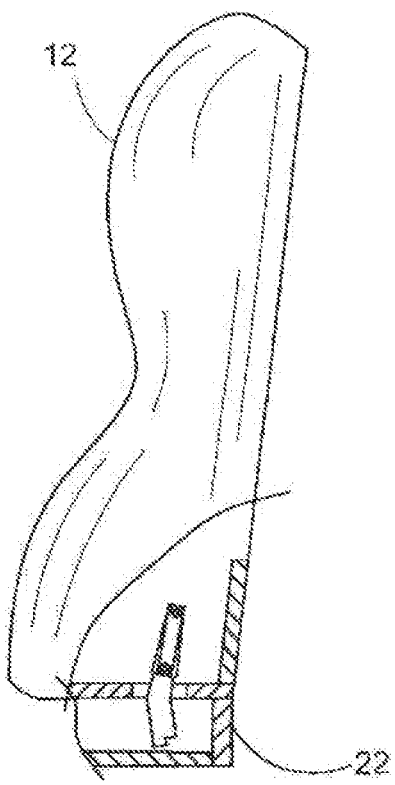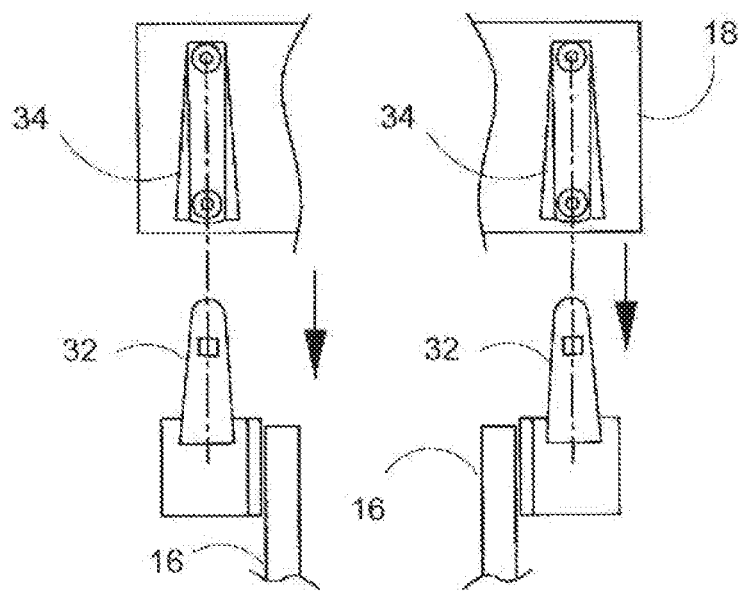

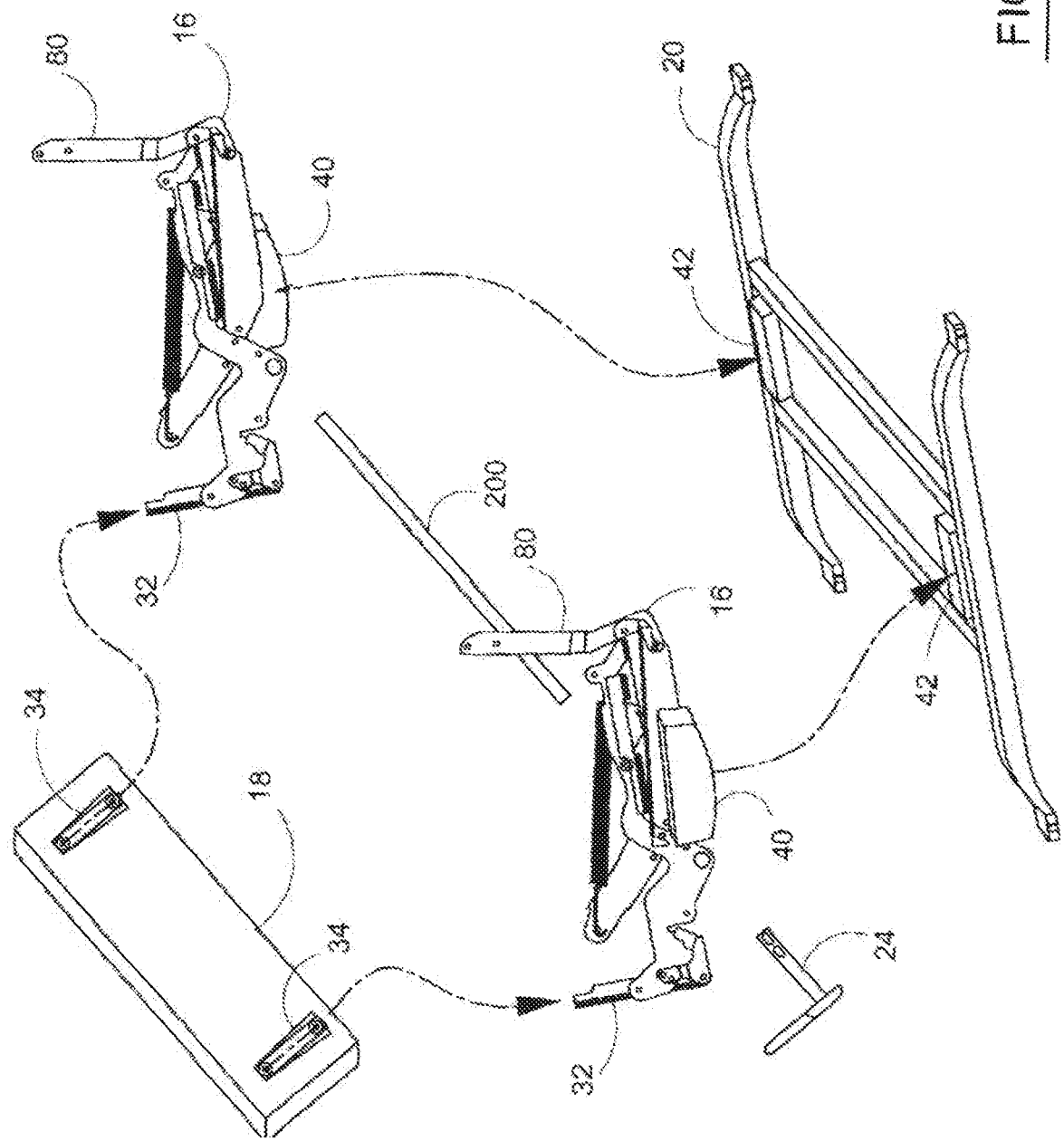

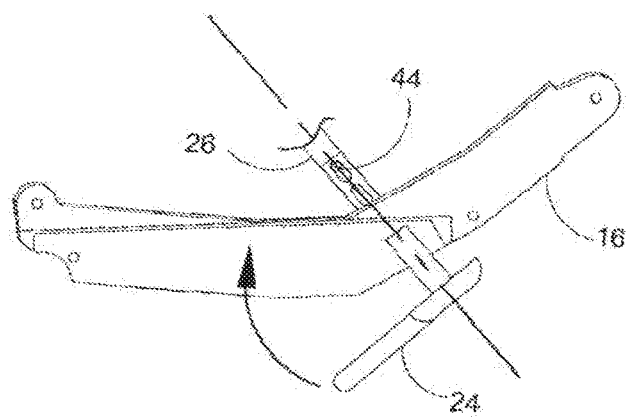
FIG.8
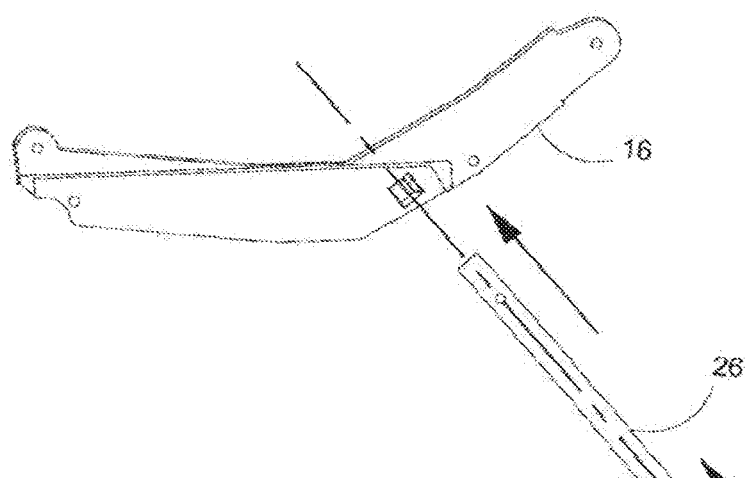
FIG.7
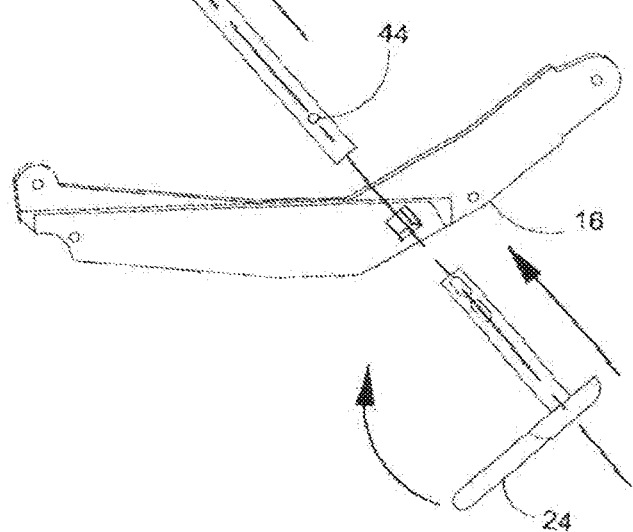

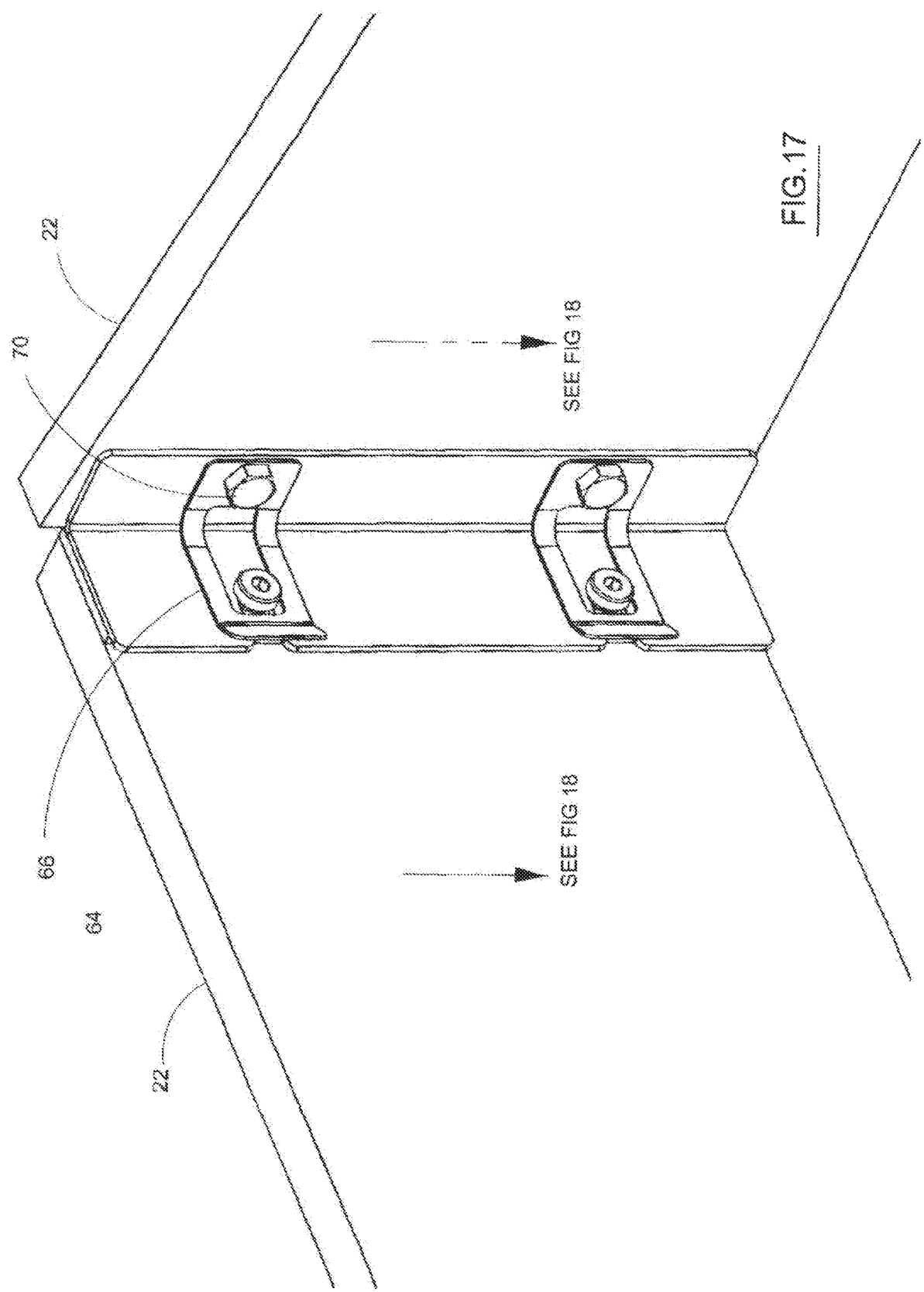

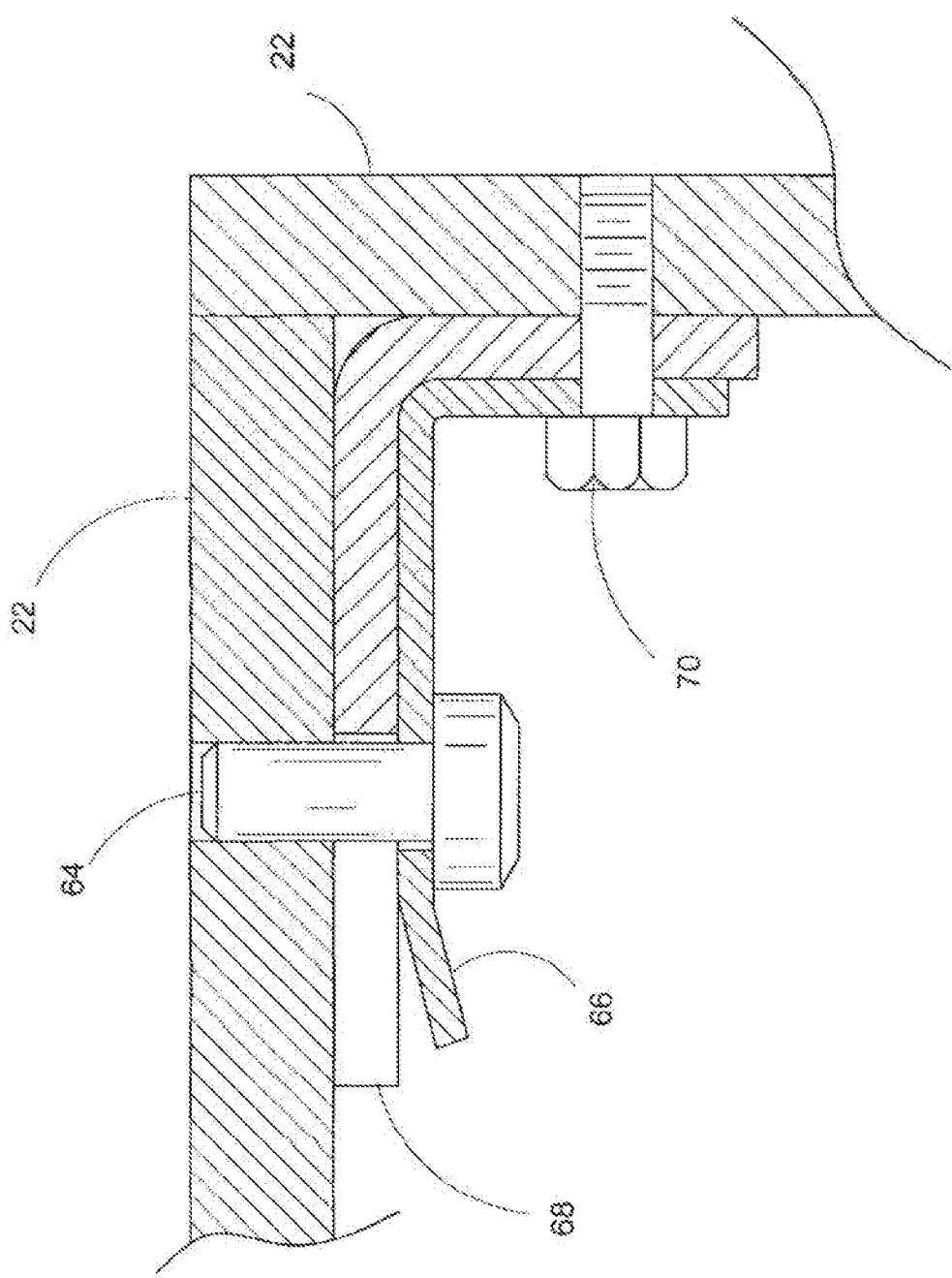

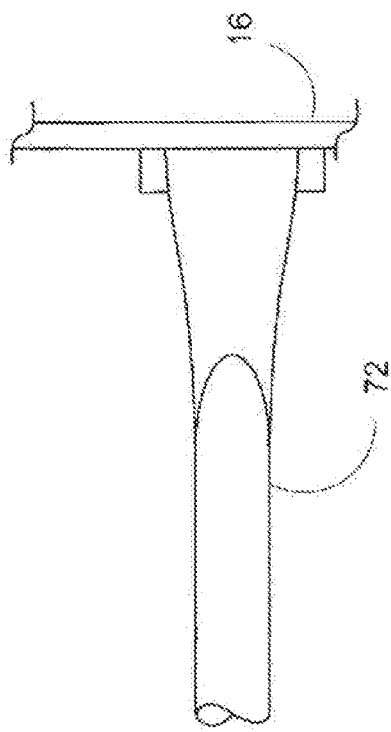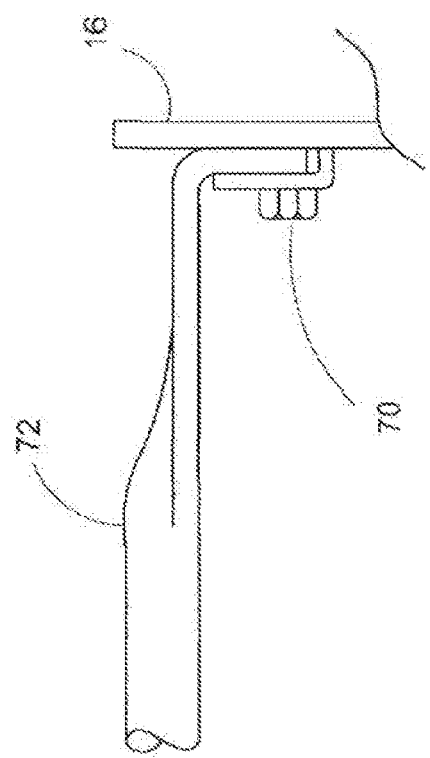
FIG.19B
FIG.19A
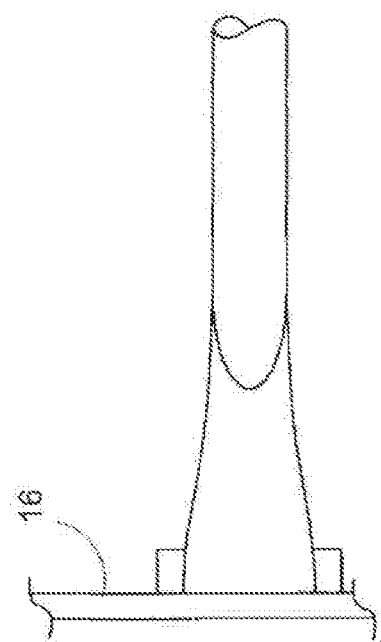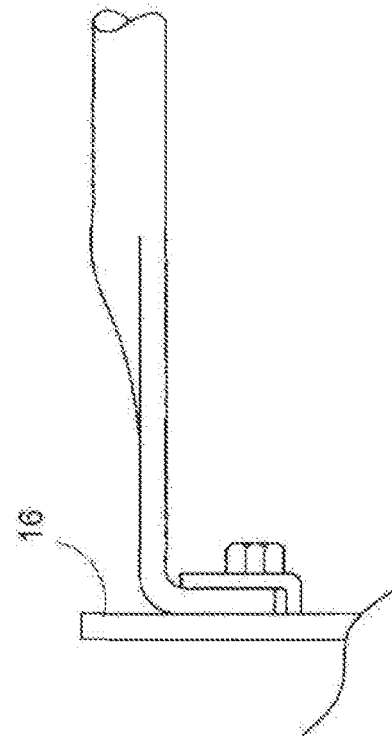

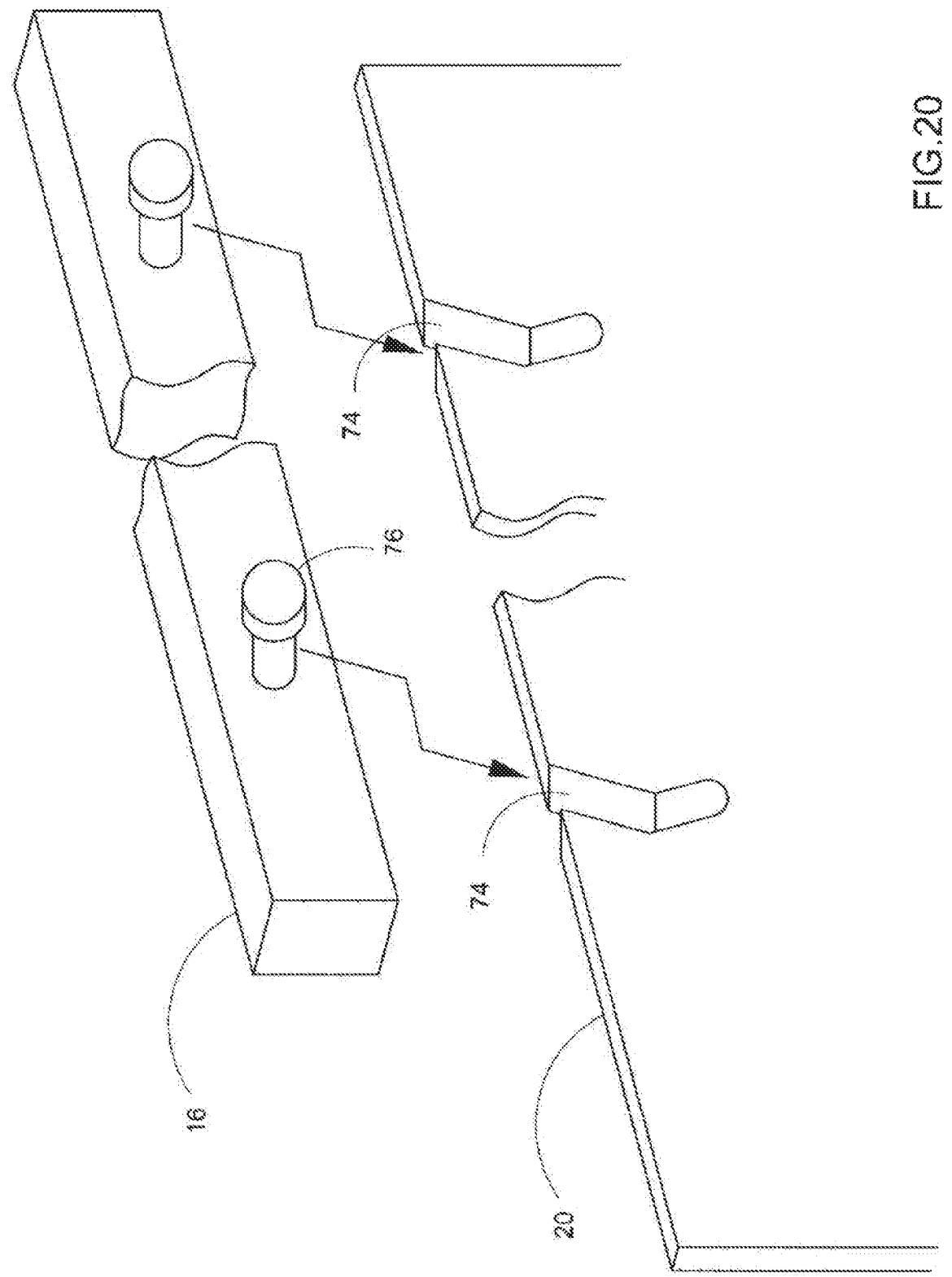

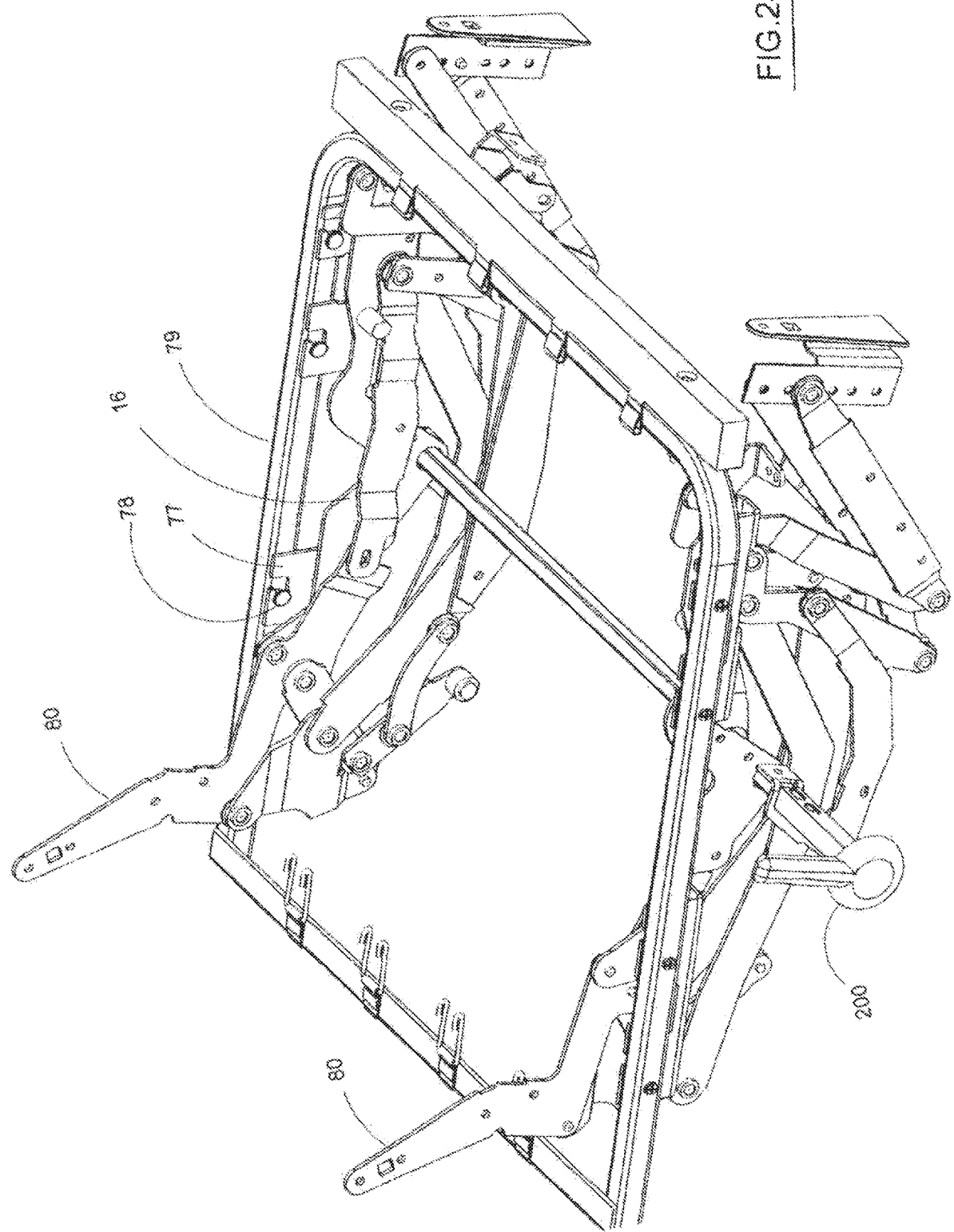

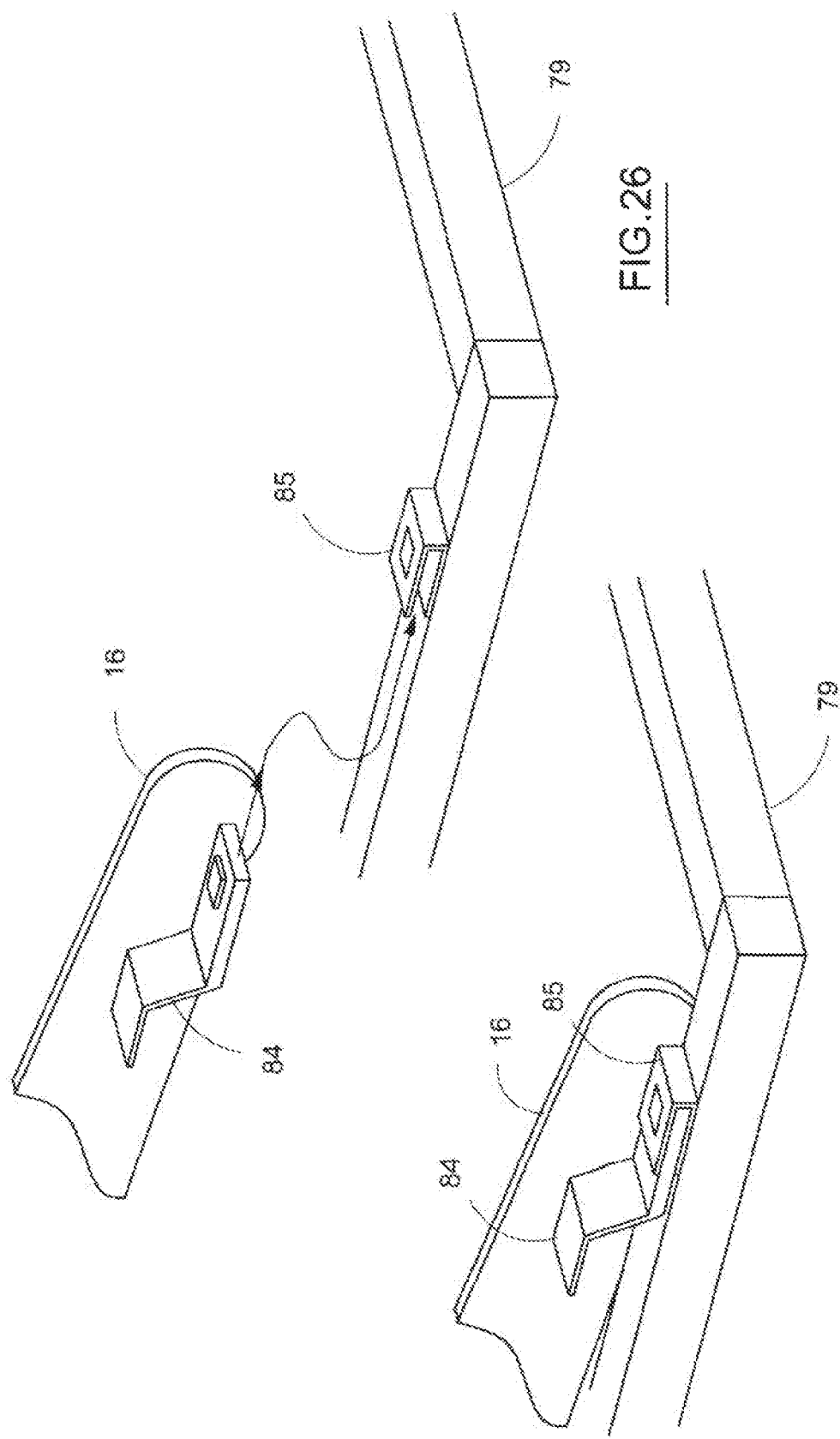

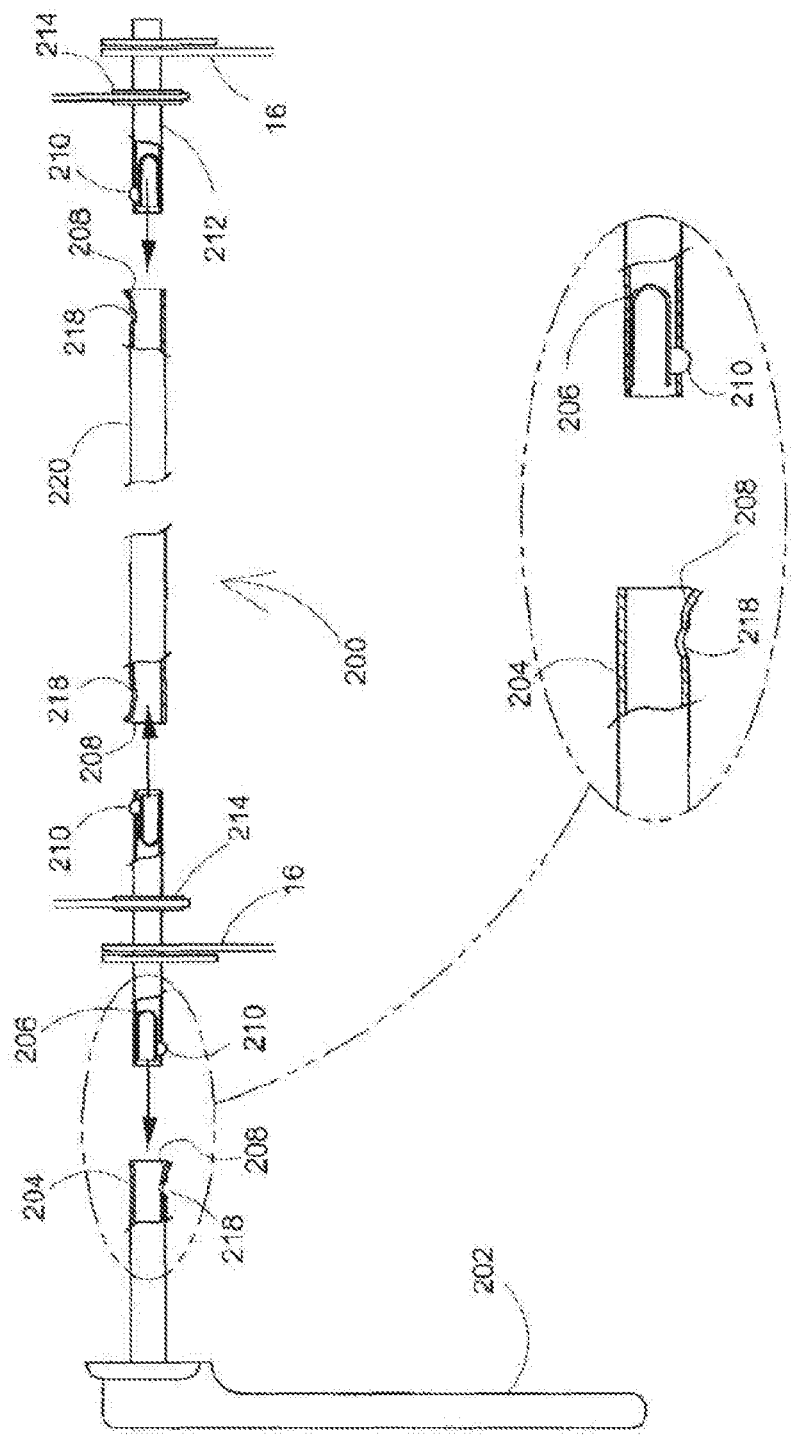

READY TO ASSEMBLE RECLINER

This application is a divisional application of U.S. patent application Ser. No. 14/167,986, filed Jan. 29, 2014, now U.S. Pat. No 9,814,314, which is a continuation-in-part application of U.S. patent application Ser. No. 14/054,804, filed Oct. 15, 2013, now U.S. Pat. No. 9,629,466, which claims benefit of and priority to U.S. Provisional Applications; No. 61/802,963, filed Mar. 18, 2013; No. 61/758,263, filed Jan. 29, 2013, No. 61/758,242, filed Jan. 29, 2013; and No. 61/713,289, filed Oct. 12, 2012, and is entitled to those filing dates for priority. The specifications, figures, and complete disclosures of U.S. patent applications Ser. Nos. 14/167,986 and 14/054,804, and U.S. Provisional Applications Nos. 61/802,963; 61/758,263; 61/758,242; and 61/713,289 are incorporated herein in their entireties by specific reference for all purposes.

FIELD OF INVENTION

The present invention relates to a ready-to-assemble (RTA) recliner and components thereof that assembles in a manner significantly less complex than current recliners.

BACKGROUND OF THE INVENTION

Ready-to-assemble furniture is very popular because it can be relatively inexpensive as compared to fully assembled furniture, and for ease of assembly. However, there are pieces of furniture that have been proven to be exceedingly difficult to provide as ready to assemble furniture. One such type of furniture relates to any type of furniture in which a recliner mechanism is included.

Recliner mechanisms create particular problems when provided with ready to assemble furniture; in fact, the precision of preparing the interlocking parts is typically beyond the ability of the average person working with ready to assemble furniture. The present invention addresses this deficiency and provides a novel RTA assembly whereby recliner components are provided.

SUMMARY OF INVENTION

In various embodiments, the present invention comprises an RTA recliner that assembles in a manner significantly less complex then current recliners. The RTA recliner mechanism of the present invention is also easy for assembly in a manufacturing environment due to the fact that the novel configuration as an RTA article speeds up the assembly process. In an environment where a manufacturer of distributor desires to assemble the RTA recliner prior to shipment, it provides a more rapid assembly time then currently assembled recliners.

Persons familiar with the furniture industry in the U.S. recognize it is difficult to manufacture reclining furniture outside states like MS and NC, because it is hard to find skilled labor to do this. With the recliner of the present invention, including the inventive slide and lock concept mechanism mounting configuration, assembly is easier for manufacturers and gives manufacturers greater latitude to recruit and hire persons capable of assembly. Although the general description herein is illustrated as a recliner, the present invention is suitable for many types of furniture, including, but not limited to gliding recliners, rockers, swivel recliners, swivel chairs, sofas, loveseats, chairs, sectionals, modular pieces, and the like.

In one embodiment, the present invention is a ready to assemble (RTA) recliner comprising: a first configuration, being a disassembled configuration, said first configuration having an assembled functioning recliner mechanism, wherein said mechanism is constructed and arranged to be packaged with component parts; and a second configuration, whereby said second configuration is an assembled configuration, said assembled configuration completed in an assembly process in which hand tools, including, but not limited to, wrenches, pliers, vices, hammers, screwdrivers and the like are not required, said second configuration utilizing said reclining mechanism, wherein said reclining mechanism is constructed with a male-female sliding track for providing movement, said female track fixed to said RTA recliner, and complementary male portion sliding within said female track to provide motion and actuate said recliner mechanism into reclined and retracted positions.

BRIEF DESCRIPTION OF THE DRAWINGS

FIG. 1 is an exploded view of one embodiment of components of the present invention.

FIG. 3 is a view demonstrating assembly of a recliner footrest to a recliner scissor assembly.

FIG. 4A is a side partial cross-section view demonstrating attachment of a seat back to a furniture base.

FIG. 4B is a side partial cross-sectional view demonstrating the completion of attachment of a seat back to a furniture base from FIG. 4A.

FIG. 6 is a separate view demonstrating arrangement of a pair of recliner scissor assemblies and a foot rest connected onto a furniture base.

FIG. 7 is a perspective view of a disassembled foot rest and scissors assembly with directional arrows indicating the direction of attachment.

FIG. 8 is a partial perspective view of an assembled foot rest and scissors according to the present invention.

FIG. 17 is a perspective view of a frame fastening system utilizing an "L" clip.

FIG. 18 is a cross-section view demonstrating assembly utilizing a "C" clip.

FIG. 19A is a partial front view demonstrating base support positioned between two scissor assemblies.

FIG. 19B is a partial top view demonstrating a support between two scissor assemblies.

FIG. 20 demonstrates pin-slot connection of scissor mechanism to a rocker base.

FIG. 24 is an assembled view of scissor mechanisms to frame.

FIG. 25 is the completed attachment from FIG. 24.

FIG. 26 is a close up of scissor mechanism in position to be attached to base per directional arrows.

FIG. 27 is a separated view of a hand operated reclining assembly.

FIG. 27A is a close up of the handle attachment mechanism of FIG. 27.

DETAILED DESCRIPTION OF EXEMPLARY EMBODIMENTS

Figure 2A:
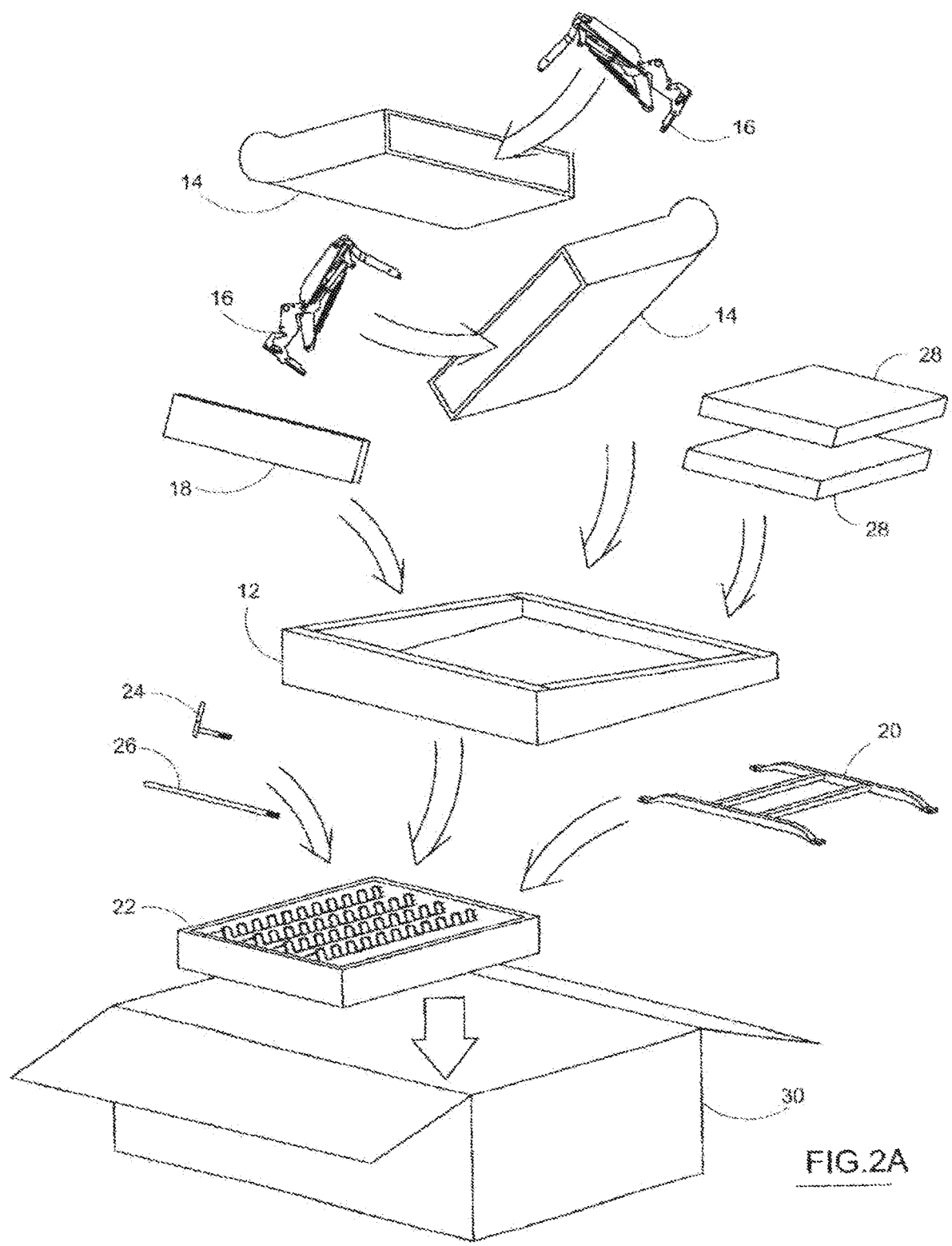
FIG. 2A is a separate view of one embodiment of the present invention showing arrangement of the components of the present invention in a packing container.
Figure 2B:
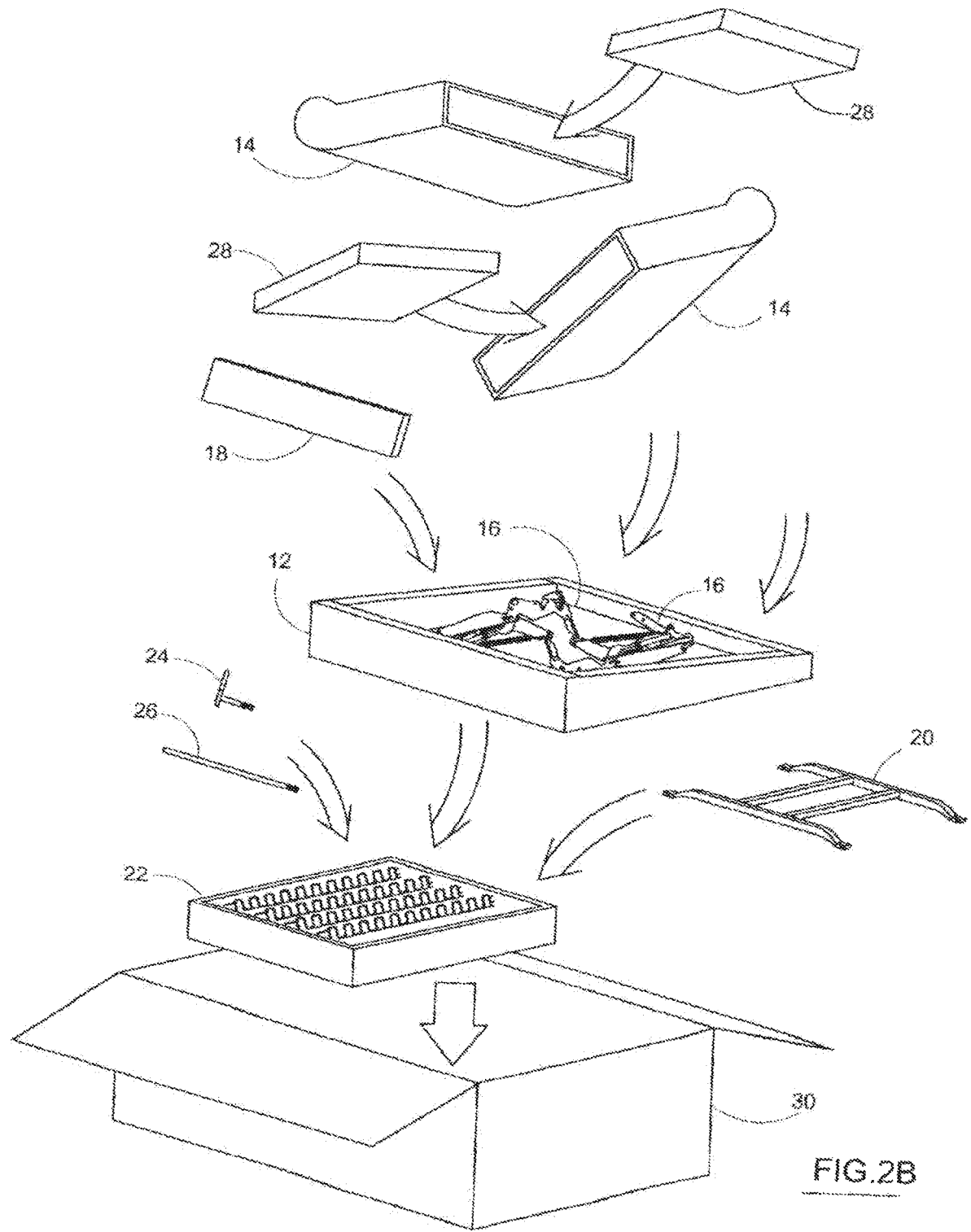
FIG. 2B is a separate view of another embodiment of the present invention showing arrangement of the components of the present invention and a packing container.
Figure 5:
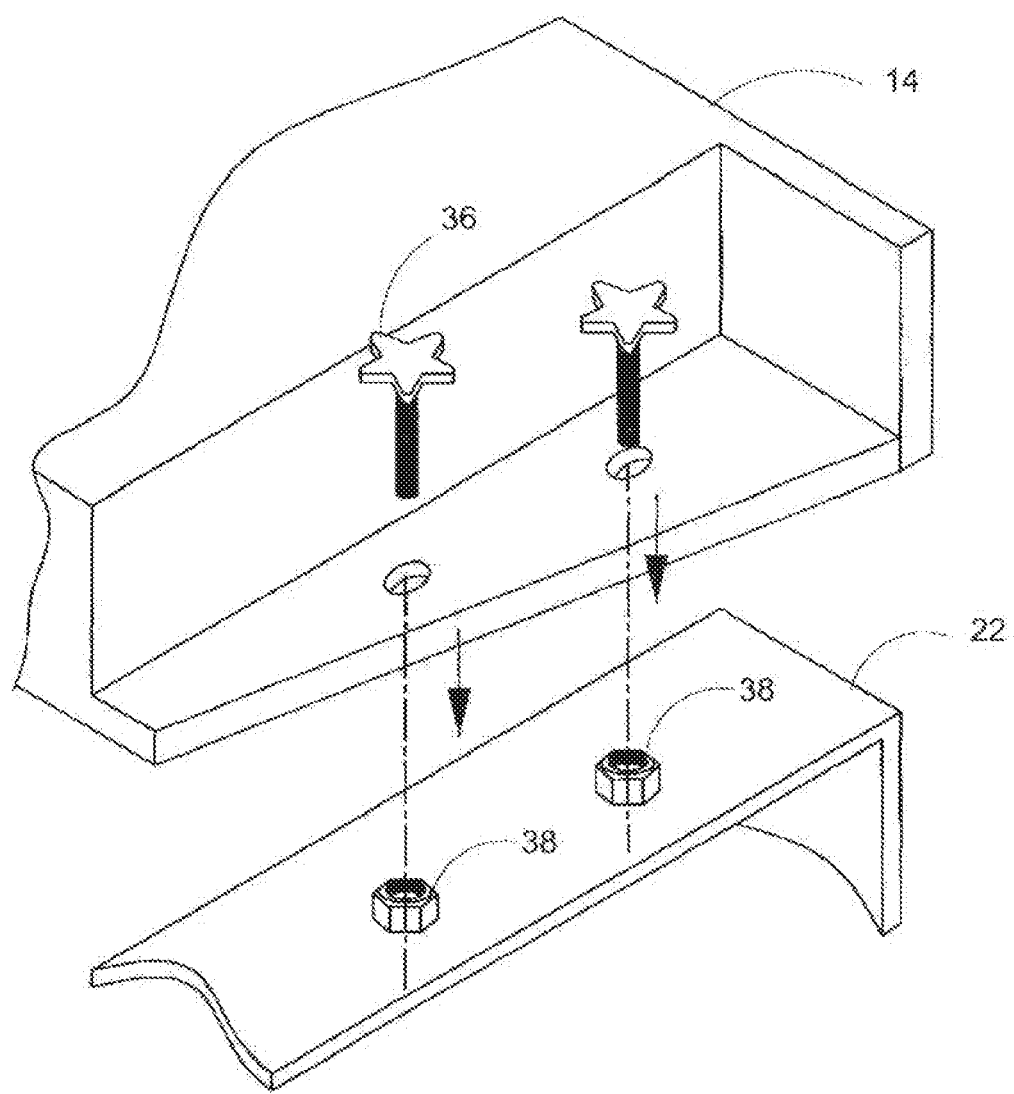
FIG. 5 is a partial perspective view demonstrating attachment of arms to a furniture base.
Figure 9:
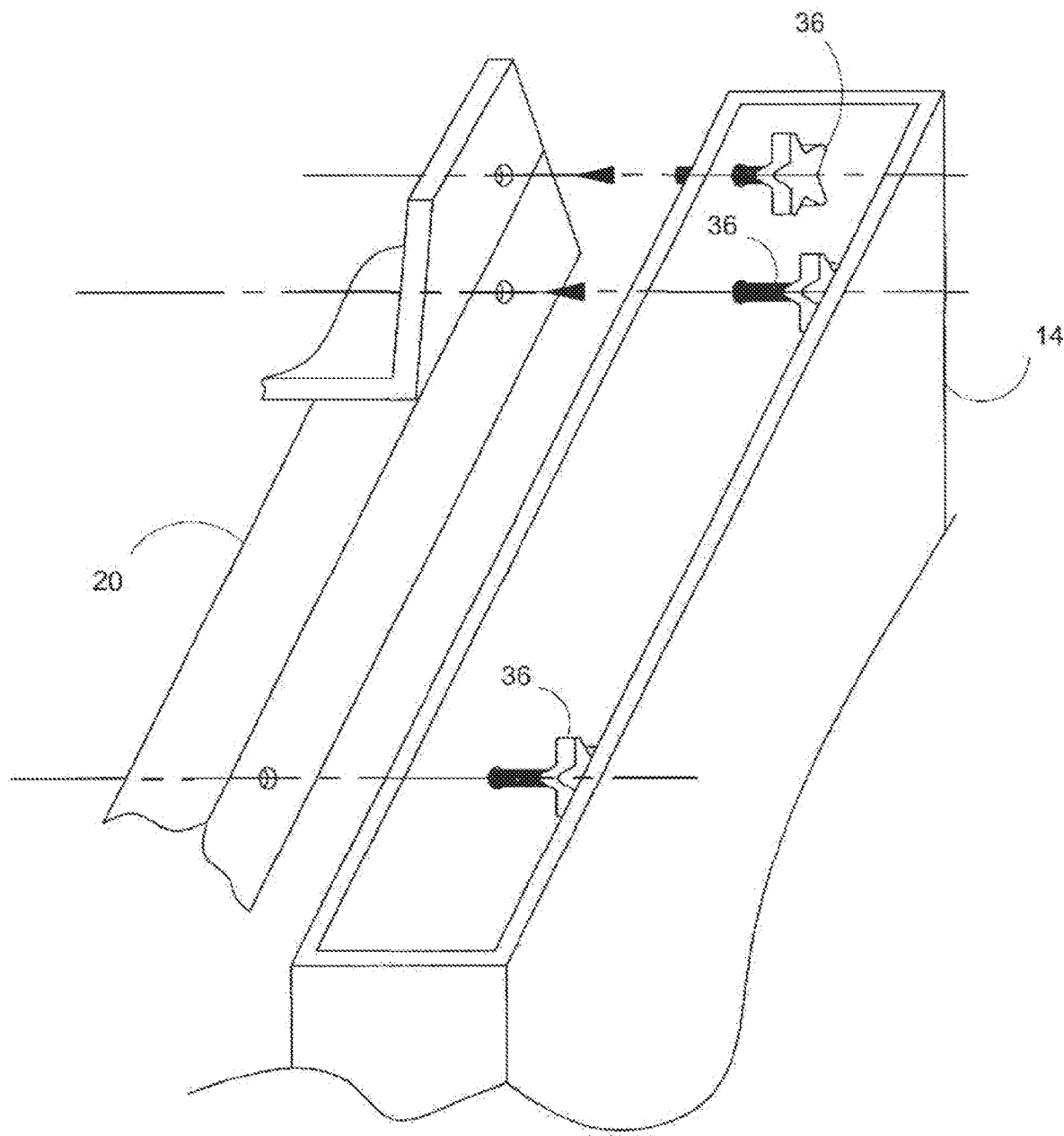
FIG. 9 is a partial perspective view showing attachment of an arm to a furniture frame.

Ready-to-assemble (RTA) furniture is popular with consumers. Reclining furniture is often bulky and cannot be provided as an RTA product. In various embodiments, the present invention comprises an article of furniture incorporating at least one recliner, whereby the configuration has a first configuration being a disassembled configuration and a second configuration being an assembled configuration. Although the term "recliner" is used herein, the recliner is intended to be used as a stand-alone recliner, or a recliner incorporated into a sofa, love seat, sectional, and any other larger piece of furniture (larger relative to a stand-alone recliner).

The disassembled configuration, in a preferred embodiment, provides for a RTA recliner having a functional and assembled recliner mechanism secured to a seat base, but the recliner mechanism and other components are constructed and arranged to fit in a rectangular shaped container utilizing 80-99% of the interior volume of said container. The volume utilization in a rectangular container is important in maximizing volume and reducing shipping costs.

Conventional recliners are provided in one of two ways: completely disassembled and requiring significant amount of skill and tools to assemble the recliner mechanism; or completely assembled and having back portions with angular offsets relative to the seat to provide a seat back that is an obtuse angle in the sitting area. This offset results in inefficient utilization of shipping volume.

The present invention utilizes several unique recliner mechanism configurations and incorporates these into the present invention. One mechanism provides the recliner on a track with a male-female interaction. The male portion is movable within the track and has locking points constructed to restrict movement at predetermined intervals. Other embodiments contemplate similar configurations as the track mechanism. It is contemplated that configurations in which the recliner mechanism imparts a linear or substantially linear configuration when the mechanism is activated. The novel linear relationship of the movable portion in relation to the fixed portion provides the geometric configuration that allows the recliner to be packaged in an unassembled configuration in a rectangular box with the other furniture components. In one embodiment, the mechanism is moved with a slide and lock arrangement. In yet another embodiment, the mechanism interaction is through a snap and lock system.

In several embodiments, the present invention provides an assembly whereby the elimination of many bolts and connectors is achieved by using a slide and lock or snap assembly system. The present invention thus represents a significant cost savings in manufacture and production because the system is eliminating 20+ bolts depending on the style of mechanism. A manufacturer will be able to assemble approximately 4 times as many mechanisms with half of the labor. This also saves on repairs because the consumer can replace a part by just snapping it on and off.

The invention is contemplated to be used with all motion/reclining mechanisms, including, but not limited recliner, sofa, loveseat, sectional, loungers, and modular pieces. A non-limiting list of some of the connections includes:

1. male bracket on scissors connects to female bracket on seat box frame;
2. male bracket on scissors connects to female bracket on footrest;
3. drive tube connects to left facing scissor and right facing scissor with the spring button or push button;
4. reclining sofa mechanism has the stabilizer/support tube that connect to the left facing scissors and right facing scissors with the male and female clips;
5. arms fasten on with male-female connector (e.g., hand knob bolts);
6. release handle assembly connects with the push button or spring button;
7. the base assembly, which could be a rocker base, swivel base, glider base, glider-swivel base combination, or a stationary base, connects with a male-female slide lock, snap connection;
8. base rail positioned on the piece to make it a one-piece sofa (alternatively, it can be done as a modular piece, thereby allowing a customer to build his or her own sofa or sectional using individual pieces);
9. back snaps on to seat box frame with male-female connectors.

In one exemplary embodiment, the RTA recliner additionally minimizes the use of tools by connecting pieces with complimentary peg and slot connectors. A fixed peg inserts into a complimentary slot and moves along the slot into a position that locks and/or restricts movement of the peg.

In various embodiments, the RTA recliner of the present invention assembles without use of any tools, especially hand tools. There is no need for screwdrivers, hammers, pliers, vice grips, wrenches or any type of tools. The RTA recliner of the present invention is strong and sturdy, even when assembled without tools.

In one embodiment, as demonstrated in FIG. 1, assembly 10 is formed with a base frame 20. Said base frame 20 constructed and arranged with a cam receiver 42 that receives a rocker cam 40 whereby said rocker cam 40 is attached to the bottom portion of rocker scissor mechanism 16. A pair of rocker scissor mechanisms 16 are provided, each positioned into a cam receiver 42 in frame 20. Once each cam is positioned, a cross rod 26 is connected to each of scissor mechanisms 16. In one embodiment, cross rod 26 connects into scissor mechanism 16 by virtue of a spring-socket ball connect mechanism 44. As is known in the art, the spring socket ball connect mechanism 44 has a ball-like structure protruding outward from cross rod 26 whereby the structure is urged outward by a spring. When cross rod 26 is inserted into a receiver formed on scissor mechanism 16, the ball structure is pushed inward until mating with a locking orifice. These locking mechanisms are sometimes referred to as 20 ball detent clevis pins or ball lock pins.

As demonstrated in FIG. 3, each scissor mechanism 16 has incorporated thereon a connector 32 constructed and arranged to meet with a complementary connector 34 that is positioned on foot rest 18. This connector system as demonstrated in FIGS. 4A and 4B whereby complementary connectors are used to attach seat back 12 two furniture seat base 22. Additionally contemplated in the present invention are connectors for at least one arm portion 14 utilizing hand bolt 36 that attaches to seat base 22 by connector nuts 38 incorporated onto seat base 22.

As shown in FIG. 6, the directional arrows indicate placement of each of the scissor mechanisms 16 onto base frame 20 whereby scissor mechanisms 16 are stabilized with at least one cross rod 26 as described. In one embodiment, a foot rest handle 24 is connected to at least one of scissor mechanisms 16.

Figure 10:
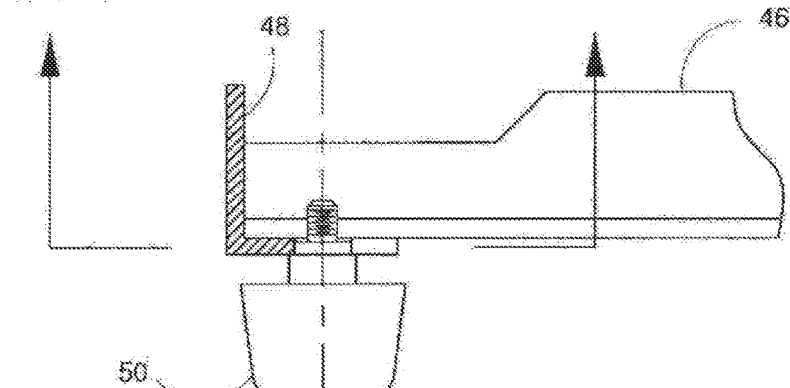
FIG. 10 is a partial cross-section view showing a keyhole attachment system according to the present invention.
Figures 11, 12:
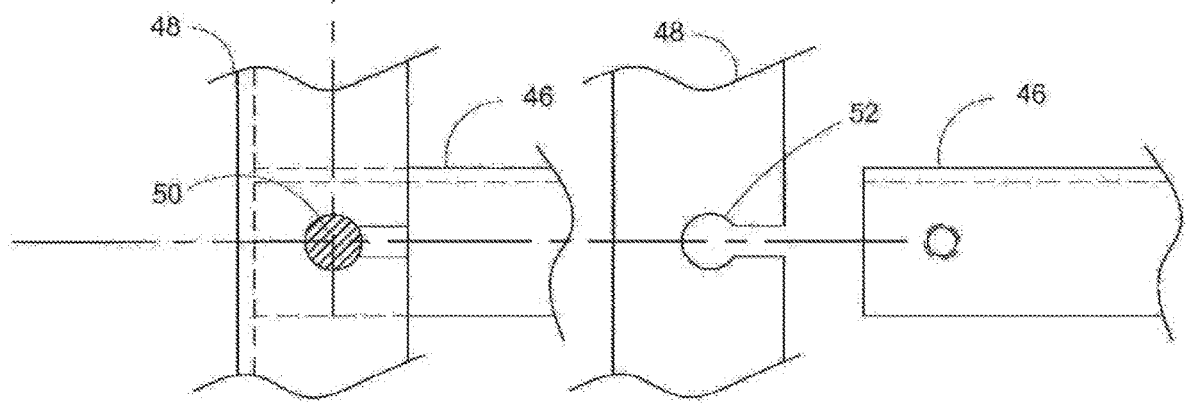
FIG. 11 is a section view along the section lines from FIG. 10 showing the keyhole attachment system.
FIG. 12 is an exploded view of the attachment system of FIG. 11.
Figure 13:
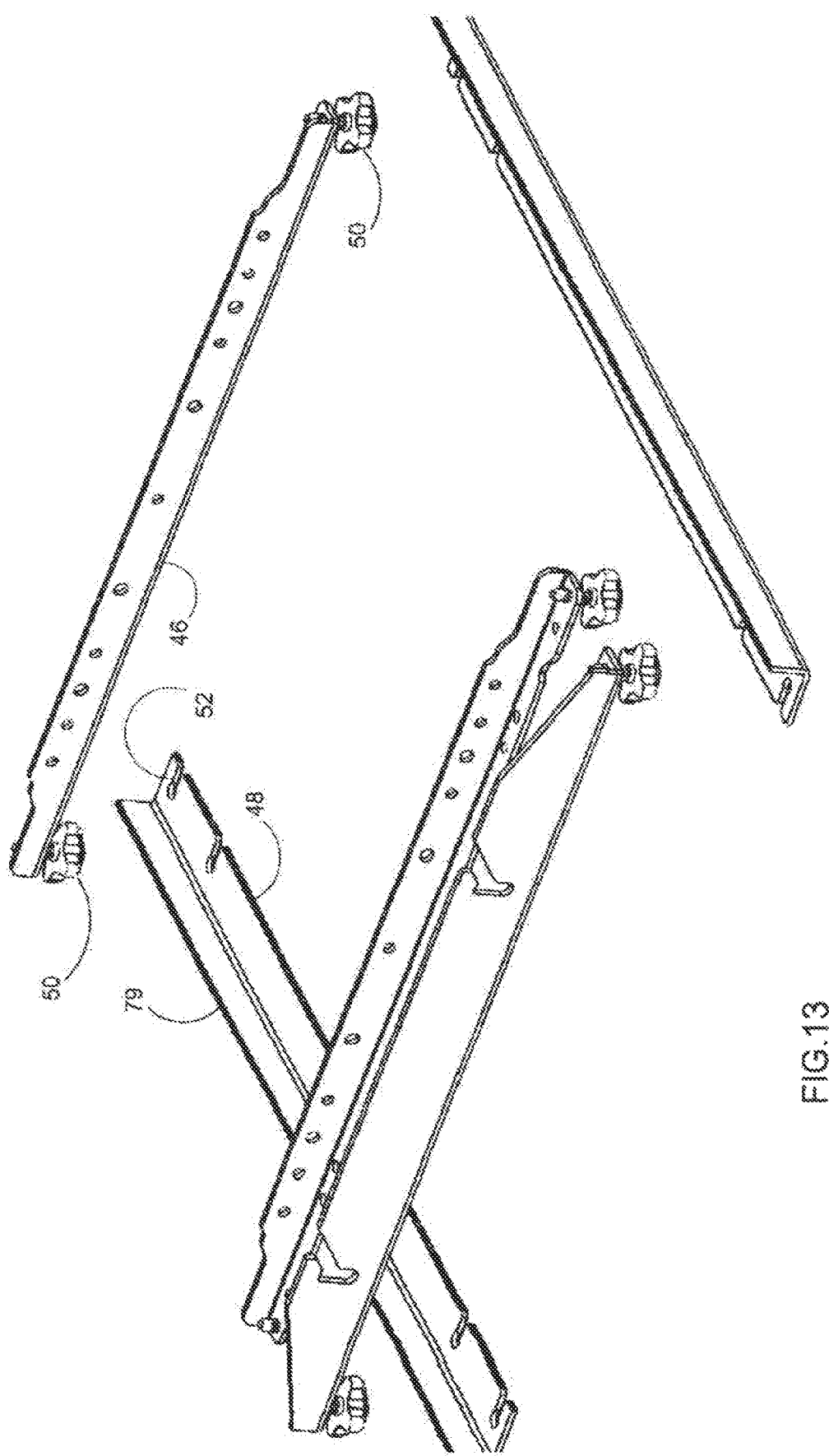
FIG. 13 is a frame fastening system demonstrating a keyhole slot attachment for the assembly.
Figure 14:
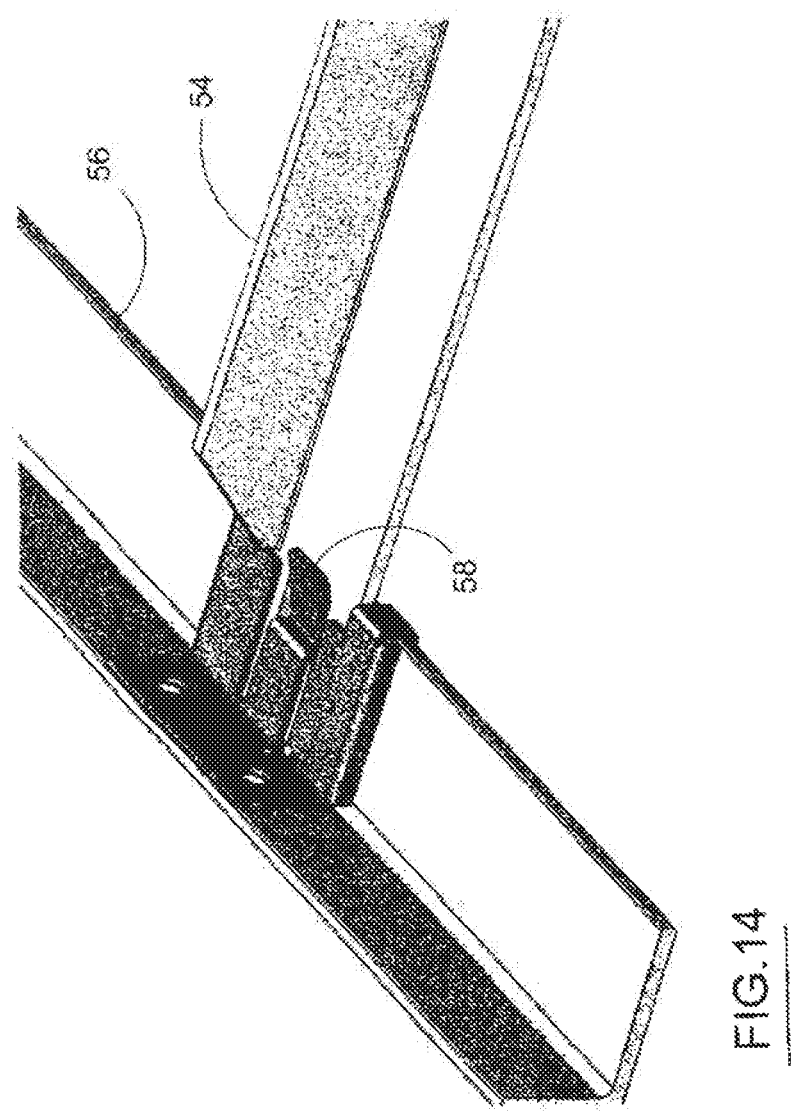
FIG. 14 is a partial perspective view demonstrating a keyhole slot frame assembly.

In one embodiment, as demonstrated in FIGS. 10 through 12, a fastener which serves a dual purpose as a foot for the article of furniture is positioned into frame member 48 and frame member 48 has incorporated there in a keyhole slot 52 that 20 interconnects for assembly of the frame. Keyhole slot 52 will interact with the screw fastener 50 to form the furniture frame as demonstrated in FIGS. 10 through 13.

Figure 15:
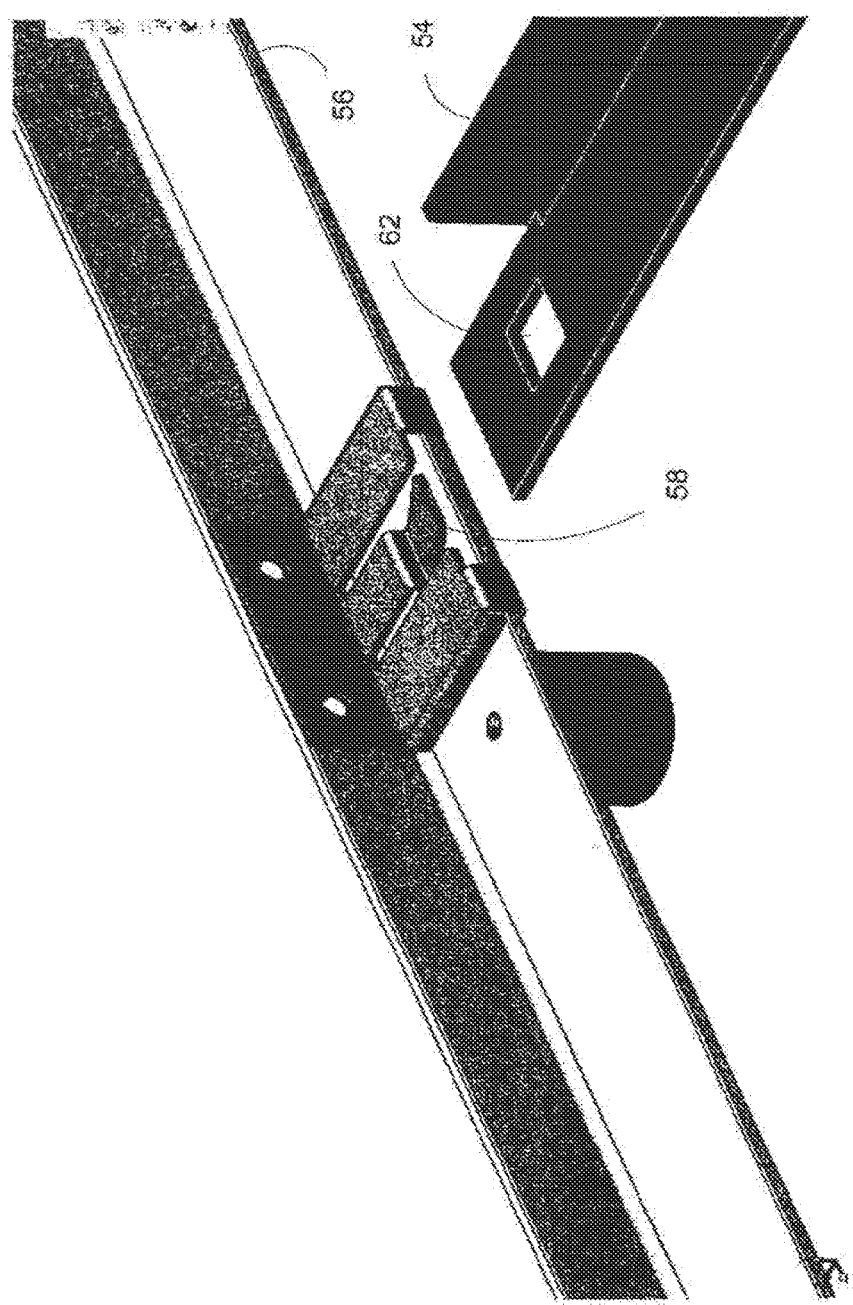
FIG. 15 is a partial perspective view of a spring clip attachment mechanism according to one embodiment of the present invention.
Figure 16:
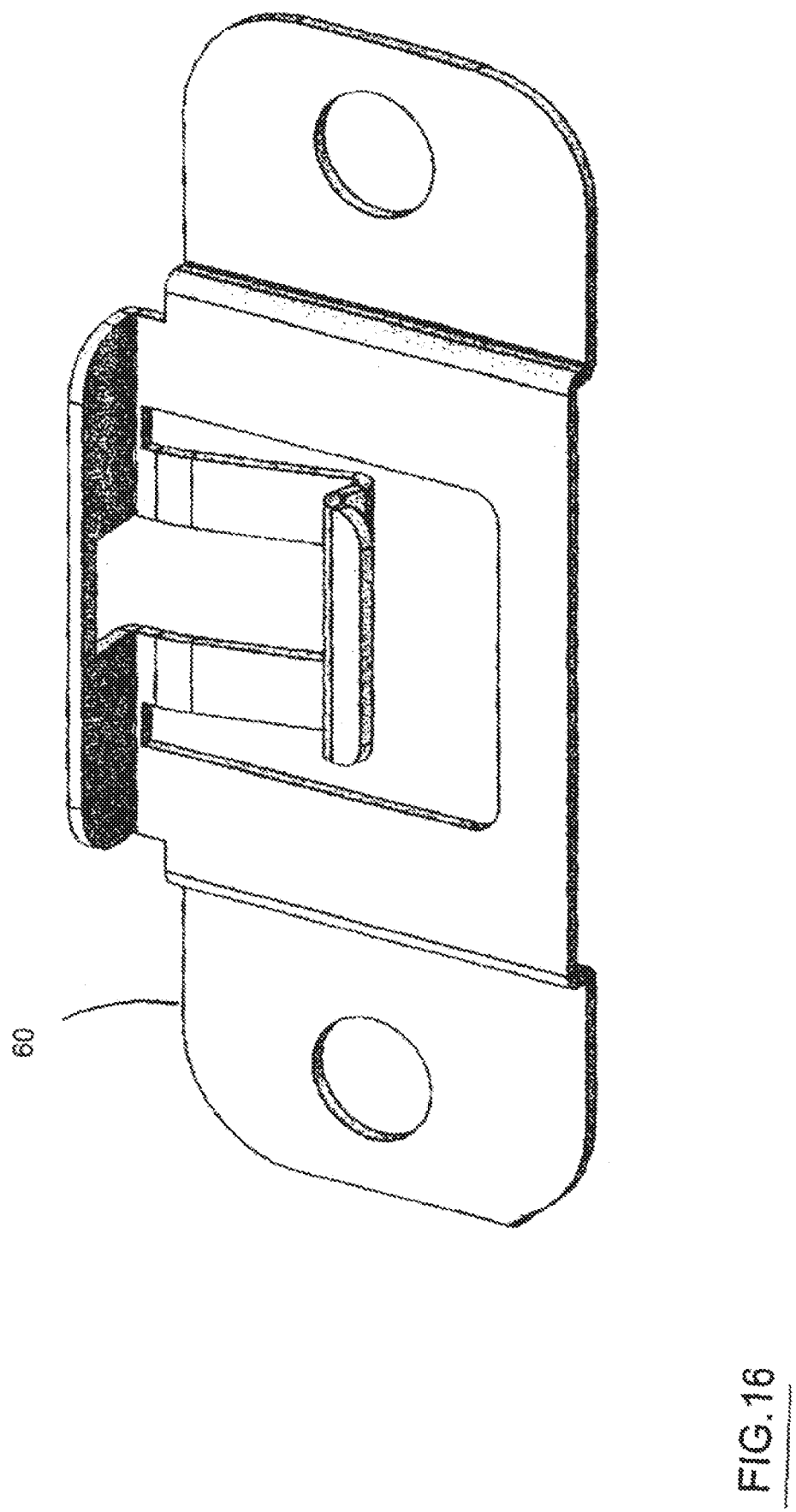
FIG. 16 is a perspective view of a frame fastener spring clip of the present invention.
Figure 21:
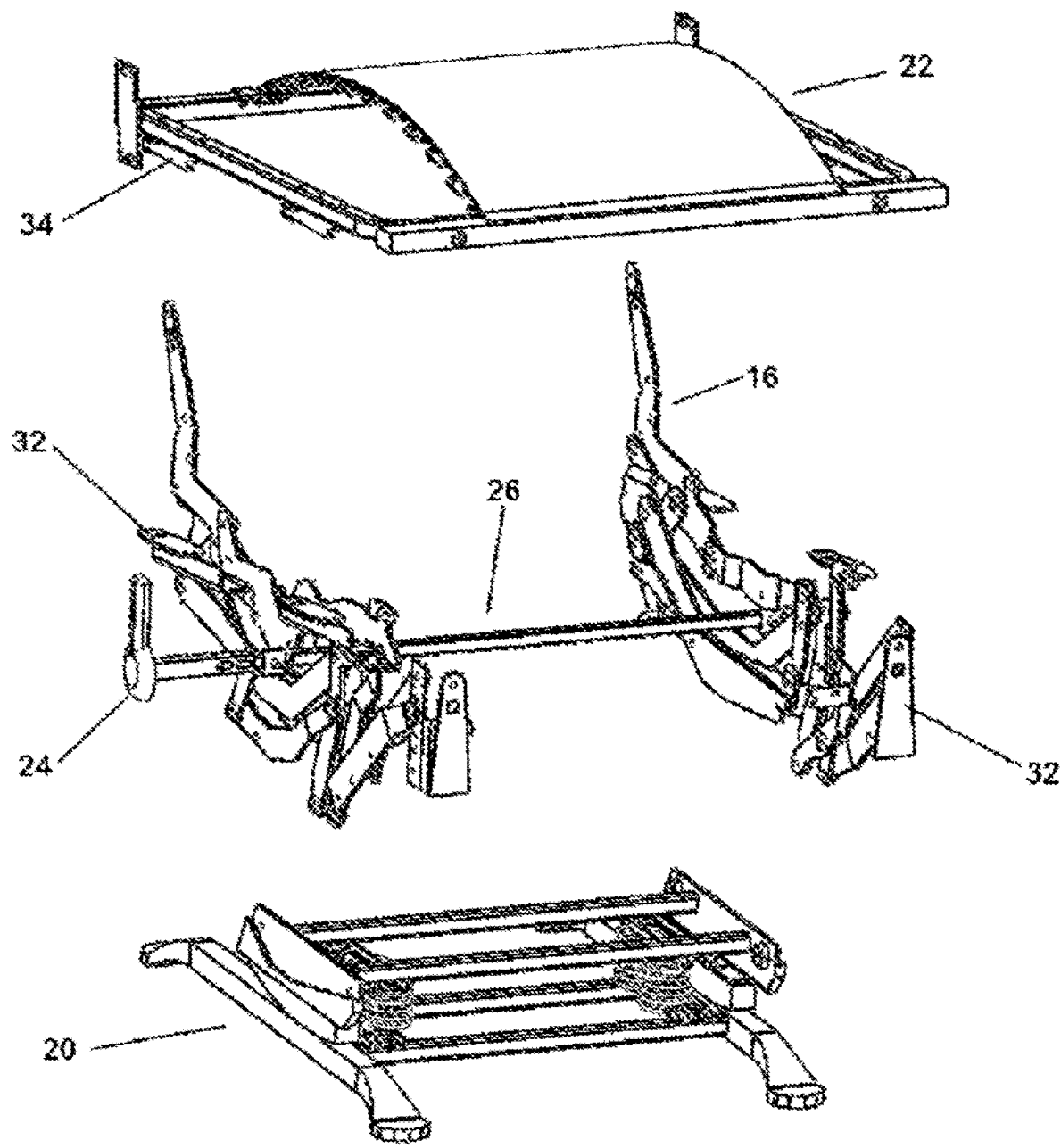
FIG. 21 is a separated view of recliner components including frame, recliner scissor mechanisms and base.

In one embodiment, spring clip 58 is constructed and arranged to assemble brace 54 with frame angle member 56. As demonstrated in FIG. 15, spring clip 58 is an "L" mount clip that interacts with spring clip locking recess 62 incorporated onto brace 54 and configured to attach brace 54 two angle members 56 in a furniture frame of the present invention. In one embodiment, as shown in FIG. 16, flat mount spring clip 60 is utilized in connecting components of the furniture frame.

In one embodiment, shown in FIG. 17, a "c" spring clip 66 is used for connecting two portions of seat base 22 whereby mounting bolt 70 and locking rivet 64 are used to effectuate the connection. FIG. 18 demonstrates a cross-section utilizing "c" spring clip 66 to connect each of seat base portions 22.

As demonstrated in FIGS. 19A and 19B, a scissor support tube 72 is configured to connect to scissor mechanism 16 utilizing a novel slot fit attachment whereby each and of support tube 72 is shaped and configured complementary to a cavity on the interior of each scissor mechanism 16. The connection of each support tube 72 is by a friction fit connection.

Figure 22:
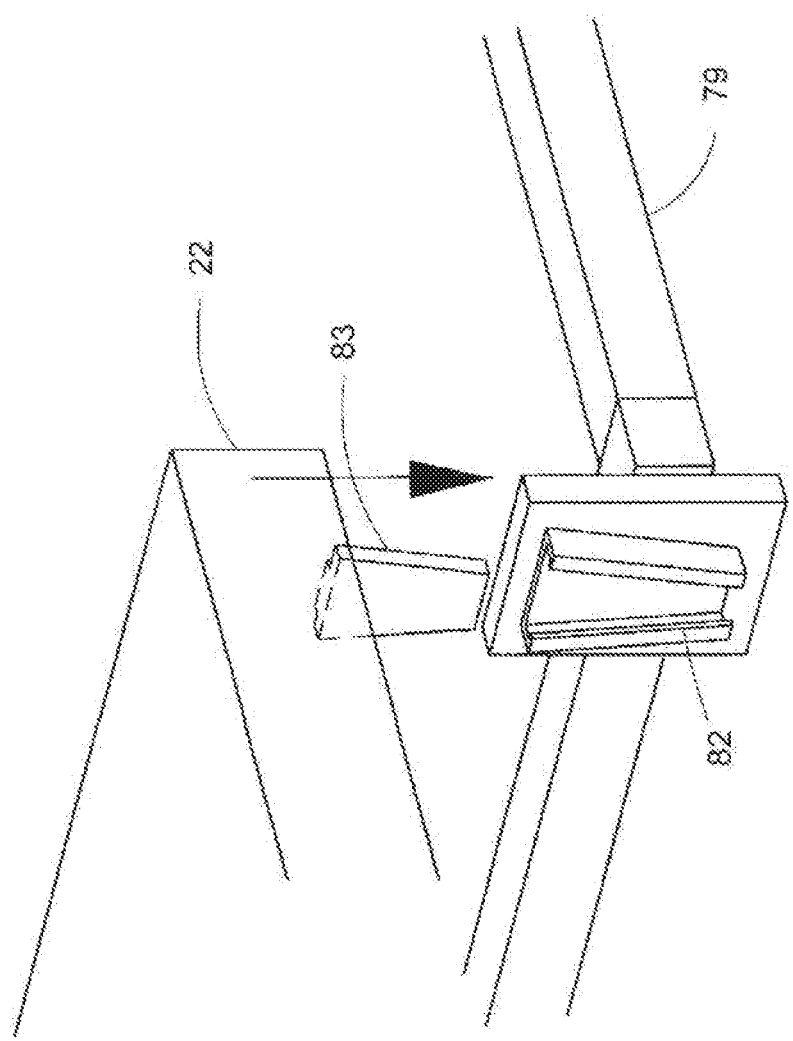
FIG. 22 demonstrates connection of seat base to frame.
Figure 23:
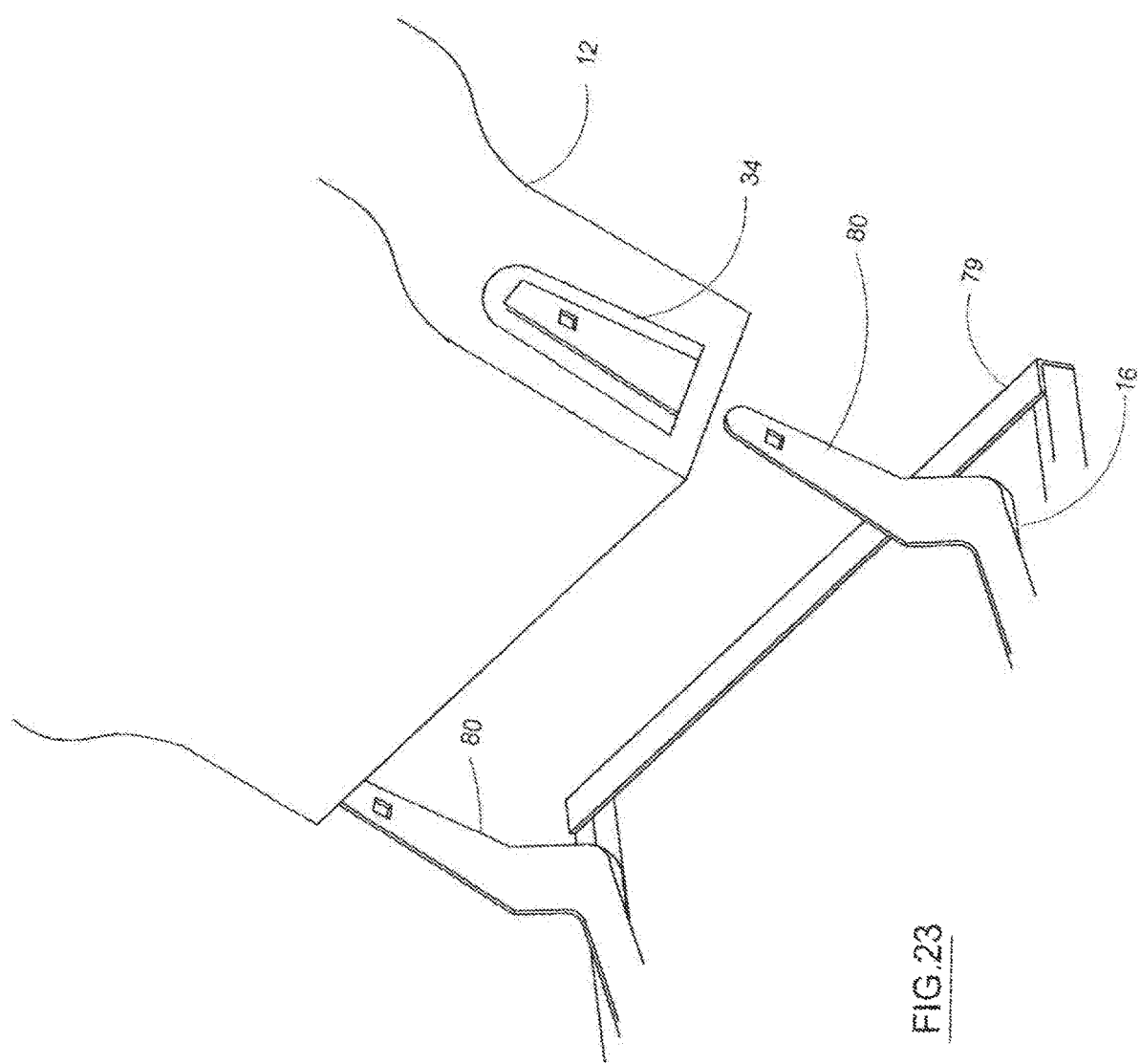
FIG. 23 demonstrates connection of foot rest to seat.

FIG. 20 demonstrates an attachment whereby scissor mechanism 16 is connected to rocker base 20 utilizing a locking pin 76 interacting with inclined slot 74. FIG. 22 demonstrates connection of seat base 22 into frame 79 utilizing complementary connectors, including base connector 83 and frame connector 82.

In one embodiment of the present invention, seat back 12 is connected to frame 79 with seatback connector 34 interacting with frame seat connector 80. In one embodiment, as demonstrated in FIGS. 25 and 26, the present invention includes a novel connection is present whereby scissor 16 is connected to frame 79 with scissor connector 84 interacting with frame connector 85.

Figure 27B:
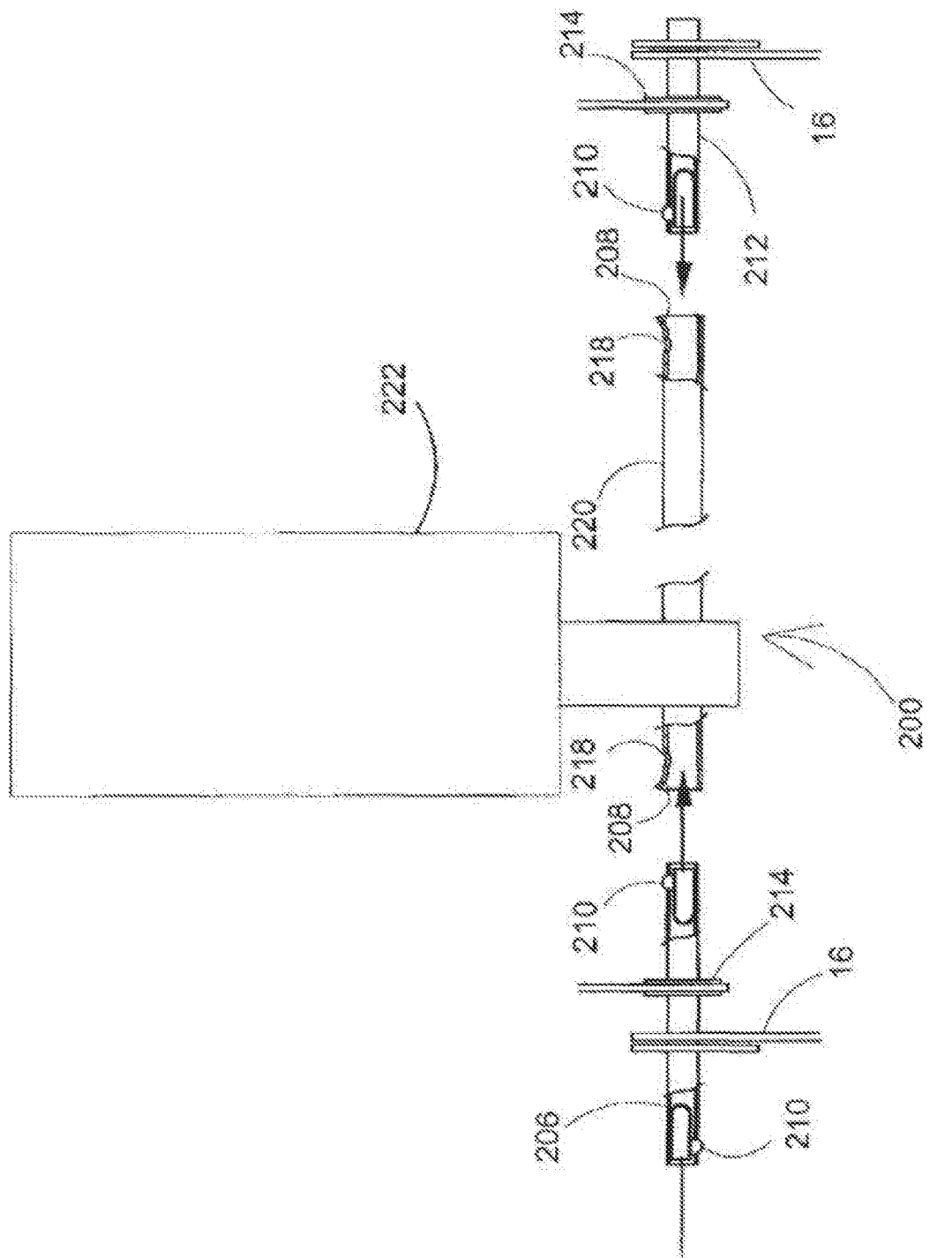
FIG. 27B is a separated view of a motor operated reclining assembly.
Figure 30:
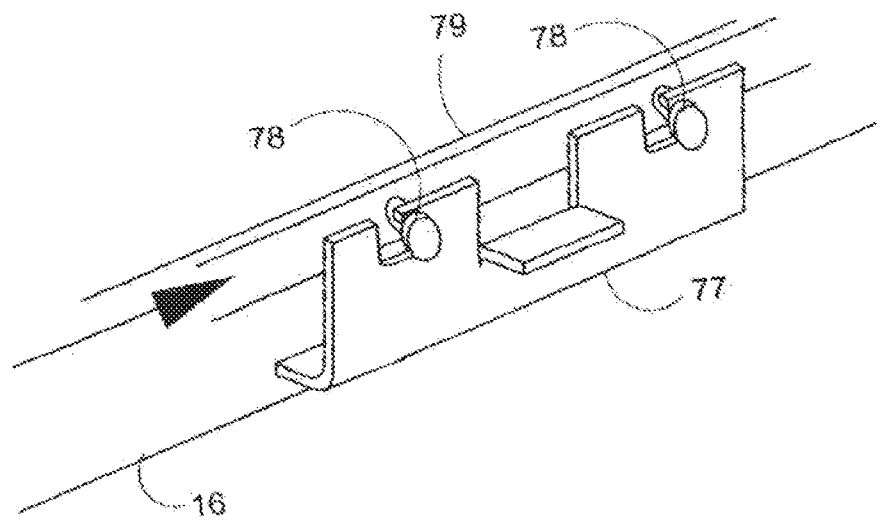
FIG. 30 is completion of attachment from FIGS. 28 and 29.
Figure 29:
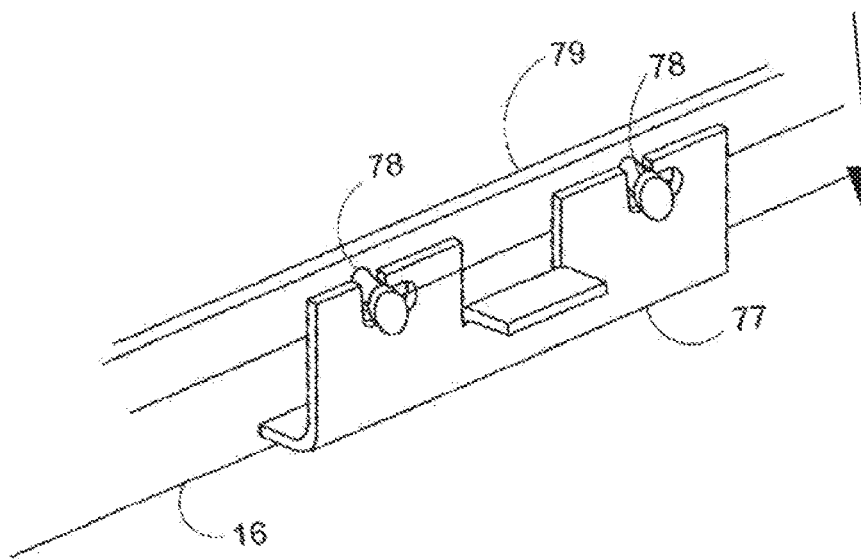
FIG. 29 is sequential beginning of attachment from FIG. 28.
Figure 28:
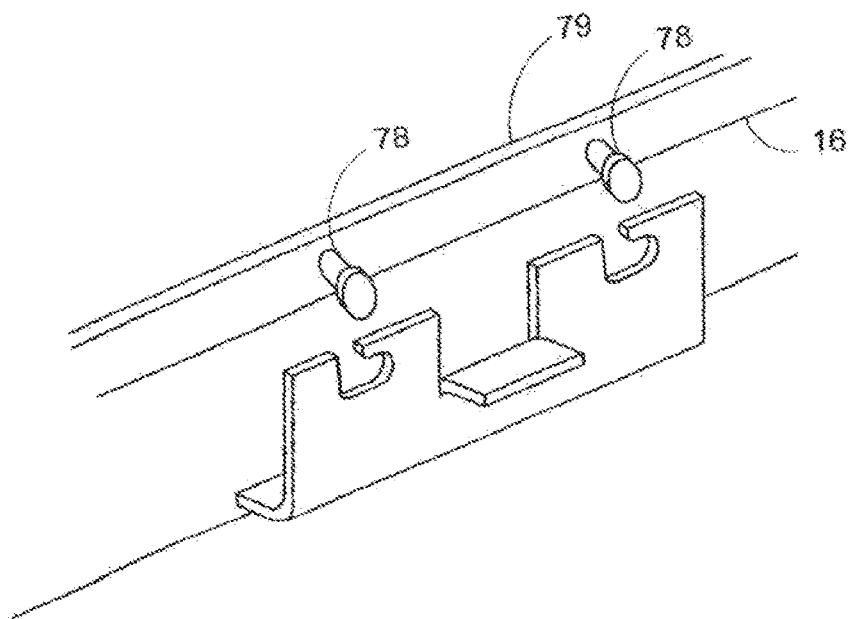
FIG. 28 is a scissor mechanism positioned for attachment to a base.

The present invention further includes a novel attachment for a manual recliner handle 202 as seen in FIGS. 27 and 27A. Handle 202 has connecting arm 204 having receiving cavity 208 and locking pin cavity 218 incorporated therewith.

FIGS. 27 and 27A further demonstrate a novel drive tube of the present invention. Drive tube assembly 200 includes first short drive tube 206 and second short drive tube 212. Each of first short drive tube 206 and second short drive tube 212 are respectively associated with one scissor assembly 216 that are positioned opposite one another. Each short drive tube is configured with a locking ball 210 that interacts and locks long (or main) drive tube 220 into position. Although the figures demonstrate a ball detent locking mechanism, the present invention is not limited to this type of connection and it is contemplated that all configurations including, but not limited to snap fit interlocks, friction fit interlocks, quick connects and disconnects, combinations thereof, and the like are suitable for use in the present invention. In a preferred embodiment, the various components of the drive tube assembly connect without the use of any type of hand tool. In another embodiment, connection of the various components of the drive tube assembly occurs without any external fasteners including, but not limited to, bolts, screws, pins, combinations thereof, and the like.

In one embodiment, handle 202 has dependent thereon handle connecting arm 204. Short drive tube 206 extends outward from scissor assembly 16 and is constructed and arranged with a connector in order to secure handle-connecting arm 204 to short drive tube 206. As stated above, although the connection 16 demonstrated is a detent connector having a ball detent 210 interacting with a ball detent connecting cavity 218, all of the various connecting mechanisms discussed above can be used according to the present invention. Each of first short drive tube 206 and second short drive tube 212 have attached thereto bushing 214.

In a preferred embodiment, bushing 214 is positioned on the interior of each scissor mechanism 16 and in close proximity to scissor mechanism 16. The positioning of bushing 214 can be varied but is generally understood to be between about 0.1 and 3 inches from scissor mechanism 16. Bushing 214 provides an important function in fact when drive tube assembly 200 turns it prevents excessive and undue stress on each scissor mechanism 16. In one embodiment, the bushing is interconnected with the scissor mechanism.

In an exemplary embodiment, each component having a female connecting configuration is further configured with an alignment flange 208 in order to simplify alignment and subsequent connection.

Drive tube assembly 200 has been determined to provide a unique configuration whereby drive to an assembly 200 can interchangeably the operated by a manual handle 202 or a drive motor 222 as desired. There are currently no recliner drive tube assemblies in existence that are readily interchangeable between manual and motorized configurations.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A connection apparatus for furniture, comprising:
  a pair of scissor mechanisms, one left facing and one right facing, each with a top, bottom, front and back;

one or more seat connectors directly positioned on the top of each of said scissor mechanisms, said one or more seat connectors adapted to receive and snap-lock one or more corresponding seat box connectors mounted on a furniture seat box;

a main drive tube operatively associated with said pair of scissor mechanisms, wherein the main drive tube is connected at least at a first end to one of said scissor mechanisms through a snap fit connection;

a first short drive tube with a first end and second end, said first extending inwards from one of said scissor mechanisms, and said second end extending outward from that scissor mechanism, wherein the main drive tube is connected through a snap fit connection free of independent fasteners to the first end of the first short drive tube; and a handle connected by a snap-fit connection to the second end of the first short drive tube.

2. The connection apparatus of claim 1, further comprising one or more arms connected to said furniture seat box by a plurality of male-female connectors.

3. The connection apparatus of claim 1, further comprising a drive tube assembly.

4. The connection apparatus of claim 3, wherein the drive tube assembly is operationally interchangeable through manual and motorized movement.

5. The connection apparatus of claim 1, further comprising a handle assembly operatively associated with the first short drive tube.

* * * * *